US011956614B2

(12) United States Patent
Yang et al.

(10) Patent No.: US 11,956,614 B2
(45) Date of Patent: Apr. 9, 2024

(54) SPEAKER DEVICE

(71) Applicant: AAC Microtech (Changzhou) Co., Ltd., Changzhou (CN)

(72) Inventors: Huhu Yang, Shenzhen (CN); Wei Wei, Shenzhen (CN); Zhaoyu Yin, Shenzhen (CN); Zhizhu Chen, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 159 days.

(21) Appl. No.: 17/839,433

(22) Filed: Jun. 13, 2022

(65) Prior Publication Data

US 2023/0217181 A1 Jul. 6, 2023

(30) Foreign Application Priority Data

Dec. 30, 2021 (CN) ........................ 202123436627.6

(51) Int. Cl.

| | |
|---|---|
| ***H04R 9/06*** | (2006.01) |
| ***H04R 1/28*** | (2006.01) |
| ***H04R 7/12*** | (2006.01) |
| ***H04R 7/20*** | (2006.01) |
| ***H04R 9/02*** | (2006.01) |
| ***H04R 9/04*** | (2006.01) |

(52) U.S. Cl.

CPC ............... *H04R 9/06* (2013.01); *H04R 1/288* (2013.01); *H04R 7/12* (2013.01); *H04R 7/20* (2013.01); *H04R 9/025* (2013.01); *H04R 9/045* (2013.01); *H04R 2400/11* (2013.01)

(58) Field of Classification Search

None

See application file for complete search history.

(56) References Cited

U.S. PATENT DOCUMENTS

| | | | | |
|---|---|---|---|---|
| 10,791,399 | B2 * | 9/2020 | Matsunaga | H04R 3/02 |
| 11,057,712 | B2 * | 7/2021 | Zhang | H04R 9/04 |
| 2008/0069387 | A1 * | 3/2008 | Cheung | H04R 1/028 381/301 |
| 2011/0051987 | A1 * | 3/2011 | Ueda | H04M 19/04 381/412 |
| 2016/0127824 | A1 * | 5/2016 | Jiang | H04R 9/02 381/349 |
| 2017/0289672 | A1 * | 10/2017 | Yang | H04R 1/22 |
| 2017/0303033 | A1 * | 10/2017 | Shao | H04R 9/025 |
| 2018/0027322 | A1 * | 1/2018 | Shi | H04R 1/288 381/353 |
| 2018/0035198 | A1 * | 2/2018 | Zhong | H04R 9/025 |
| 2018/0302724 | A1 * | 10/2018 | Li | H04R 1/06 |
| 2020/0213753 | A1 * | 7/2020 | Cao | H04R 9/06 |

* cited by examiner

*Primary Examiner* — Paul W Huber

(74) *Attorney, Agent, or Firm* — W&G Law Group

(57) ABSTRACT

A speaker device is provided. The speaker device includes a frame, and a vibration unit, a magnetic circuit unit, and air-permeable isolation member. The magnetic circuit unit includes a yoke fixed to the frame. The yoke and the frame are spaced to form a leakage port to enable leaking from a side surface of the speaker device. The sound-producing inner cavity communicates with the leakage port. The air-permeable isolation member completely covers the leakage port. The leakage port communicates with the outside through the leakage hole. Compared with the related art, the speaker device of the present disclosure has a yoke leakage structure, which can realize self-sealing and is conducive to assembling.

10 Claims, 5 Drawing Sheets

A-A

SPEAKER DEVICE

TECHNICAL FIELD

The present disclosure relates to the field of electroacoustic conversion, and in particular, to a speaker device applied to portable electronic products.

BACKGROUND

In an era of mobile Internet, the number of intelligent mobile devices continues to rise. Among a large number of mobile devices, mobile phones are undoubtedly the most common and portable mobile terminal devices. The mobile phones have extremely diverse functions, one of which is the high-quality music. Therefore, speaker devices for playing sound are widely used in intelligent mobile devices.

In the related art, the speaker device includes a frame, a vibration unit and a magnetic circuit unit to drive the vibration unit to vibrate to produce sound. The vibration unit and a magnetic circuit unit are respectively fixed to the frame. The vibration unit includes a diaphragm fixed to the frame. The magnetic circuit unit includes a yoke fixed to the frame. The yoke and the frame are spaced to form a leakage port to enable leaking from a side surface of the frame. The frame, the vibration unit, and the magnetic circuit unit enclose a sound-producing inner cavity jointly. The sound-producing inner cavity communicates with the leakage port.

However, in the related art, when the speaker device is assembled and applied to a speaker box, the speaker device cannot be fully sealed. During assembling the speaker box, three-dimensional mesh cloth is required to cover the speaker device from the back, so as to realize full filling. That is, a rear cavity of the speaker box is filled with sound-absorbing particles, and the sound-absorbing particles are encapsulated in the rear cavity by the three-dimensional mesh cloth. The three-dimensional mesh cloth is sandwiched between the yoke of the speaker device and a lower cover plate of the speaker box, thereby exposing the yoke. In this way, the three-dimensional mesh cloth is required to be assembled during the assembling the speaker box, the assembly process is complicated, and the three-dimensional mesh cloth further has a risk of powder leakage caused by deformation.

Therefore, there is a need to provide a speaker device to solve the above technical problems.

SUMMARY

An objective of the present disclosure is to provide a speaker device having a yoke leakage structure, which is capable of self-sealing and conducive to assembling to overcome the above technical problems.

In order to achieve the above objective, an aspect of the present disclosure provides a speaker device. The speaker device includes a frame, a vibration unit, a magnetic circuit unit, and an air-permeable isolation member. The vibration unit and the magnetic circuit unit are fixed to the frame, the magnetic circuit unit is configured to drive the vibration unit to vibrate to produce sound. The magnetic circuit unit includes a yoke fixed to the frame. The yoke is fixed to a side of the speaker device away from the vibration unit. The yoke and the frame are spaced to form a leakage port to enable leaking from a side surface of the speaker device. The frame, the vibration unit, and the magnetic circuit unit jointly enclose to form a sound-producing inner cavity, the sound-producing inner cavity communicates with the leakage port. The air-permeable isolation member completely covers the leakage port, and includes a bottom wall and a side wall, the bottom wall is fixed to the yoke, the side wall bends and extends from the bottom wall toward the frame, and the side wall is fixed to the frame. The side wall and/or the bottom wall are provided with a leakage hole penetrating the side wall and/or the bottom wall, and are configured to isolate external sound-absorbing particles from entering the sound-producing inner cavity, and the leakage port communicates with the outside through the leakage hole.

As an improvement, the frame has a rectangle shape, four leakage ports are respectively located at four corners of the frame, two air-permeable isolation members are respectively located at two opposite sides of a minor axis of the frame, and each of the air-permeable isolation members completely covers the two leakage ports located at a same side of the minor axis of the frame.

As an improvement, one air-permeable isolation member is provided and has a ring shape.

As an improvement, the yoke includes a yoke body and a yoke support groove, the yoke support groove is formed by recessing from a side of a periphery of the yoke body away from the vibration unit toward the vibration unit, and the bottom wall is received in and fixed to the yoke support groove.

As an improvement, the vibration unit includes a diaphragm fixed to the frame, a voice coil driving the diaphragm to vibrate, and an elastic support assembly fixed to the frame and connected to a side of the voice coil away from the diaphragm. Four elastic support assemblies are arranged right opposite to the four leakage ports, respectively, the side wall is fixed to the frame through the elastic support assembly, and the elastic support assembly and the yoke are spaced along a vibration direction of the diaphragm and jointly cover the leakage port.

As an improvement, the elastic support assembly includes an elastic member and an auxiliary diaphragm, the elastic member is fixed to the frame and connected to the voice coil, the auxiliary diaphragm is bonded to a side of the elastic member away from the diaphragm, and the side wall is bonded to the auxiliary diaphragm.

As an improvement, the frame includes a frame body and a frame leg formed by extending from the frame body, the diaphragm is fixed to a side of the frame body away from the frame leg, the yoke is fixed to the frame leg and is spaced from the frame body to form the leakage port, and the bottom wall abuts against and is fixed to the frame leg.

As an improvement, the air-permeable isolation member is made of a metal material or polyethylene terephthalate.

As an improvement, the air-permeable isolation member is made of a steel sheet or an aluminum sheet.

As an improvement, a plurality of leakage holes is arranged in a matrix on the side wall.

Compared with the related art, in the speaker device of the present disclosure, the air-permeable isolation member includes a bottom wall fixed to the yoke and a side wall bending and extending from the bottom wall toward the frame, and the side wall is fixed to the frame, so as to form a yoke leakage structure, thereby effectively extending an application range of the speaker device. The side wall and/or the bottom wall are provided with a leakage hole penetrating the side wall and/or the bottom wall and configured to isolate external sound-absorbing particles from entering the sound-producing inner cavity, and the leakage port communicates with the outside through the leakage hole, so as to realize self-sealing of the speaker device. With such a structure, the speaker device can isolate the sound-producing inner cavity from the outside through the air-permeable isolation member, and there is no need to assemble the three-dimensional mesh cloth only in subsequent application and assembling, which is conducive to assembling and application of the speaker device.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The technical solutions of the present disclosure will be described clearly and completely below with reference to the accompanying drawings of the present disclosure. The described embodiments are merely a part, rather than all of the embodiments of the present disclosure. All other embodiments obtained by those skilled in the art without creative efforts based on the embodiments of the present disclosure shall fall within the protection scope of the present disclosure.

Figure 1:
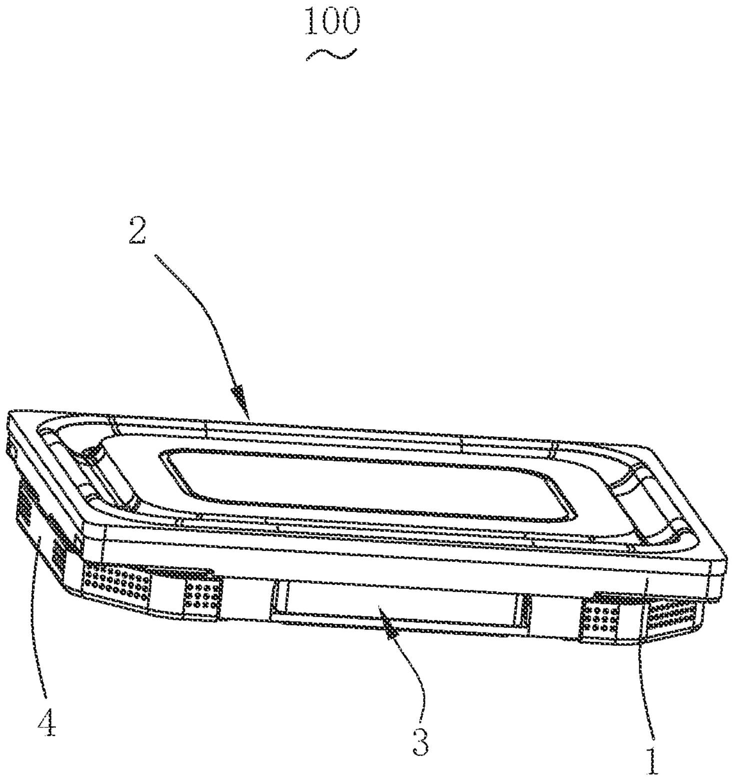
FIG. 1 is a perspective view of a speaker device according to an embodiment of the present disclosure.
Figure 2:
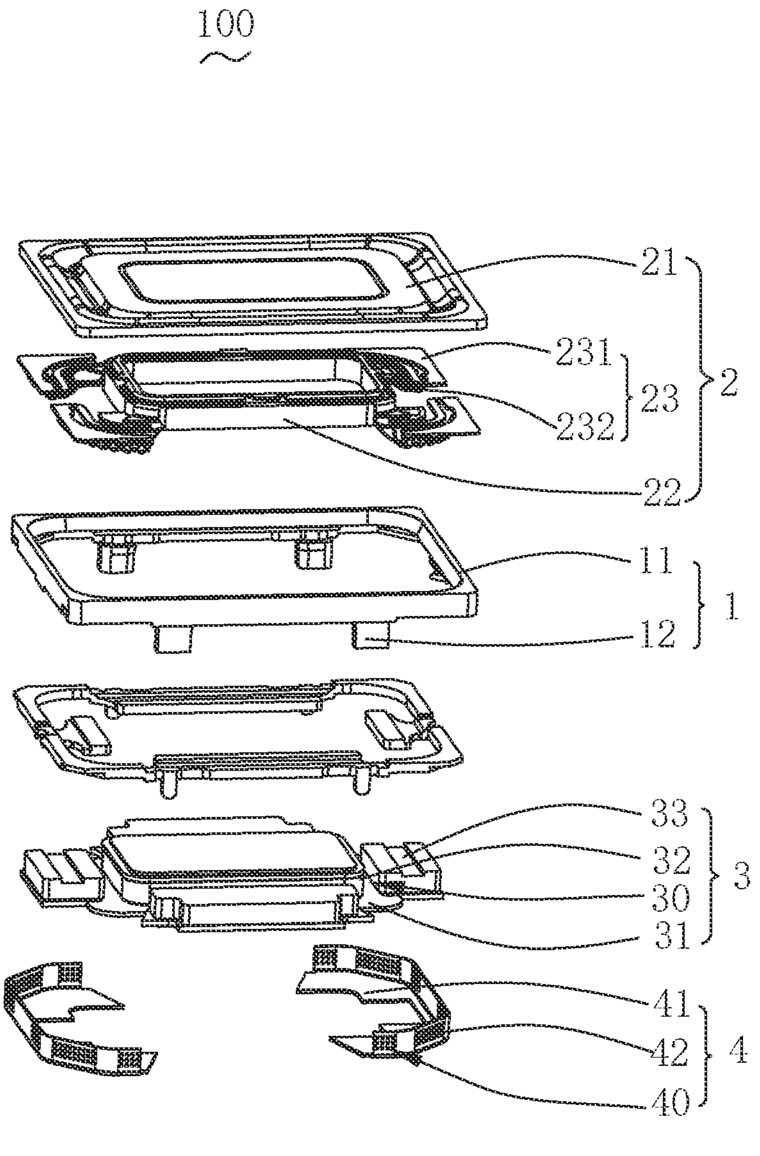
FIG. 2 is a structural schematic diagram of a speaker device according to an embodiment of the present disclosure.
Figure 3:
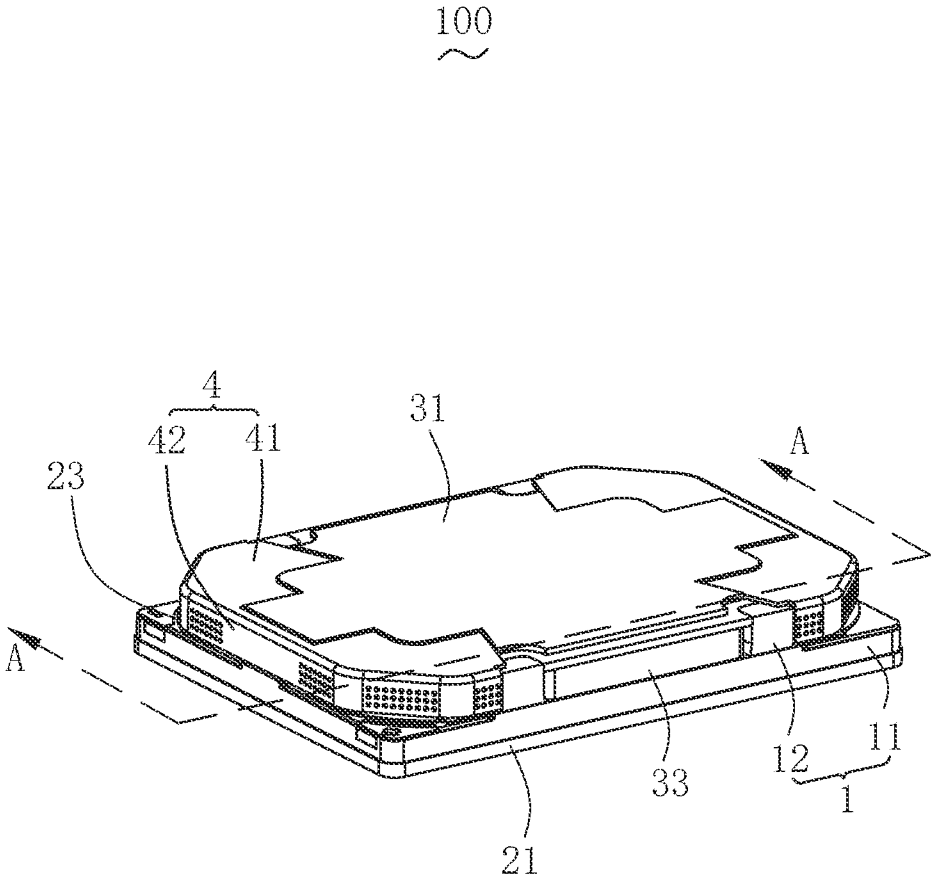
FIG. 3 is a structural schematic diagram of a speaker device according to an embodiment of the present disclosure.
Figure 4:
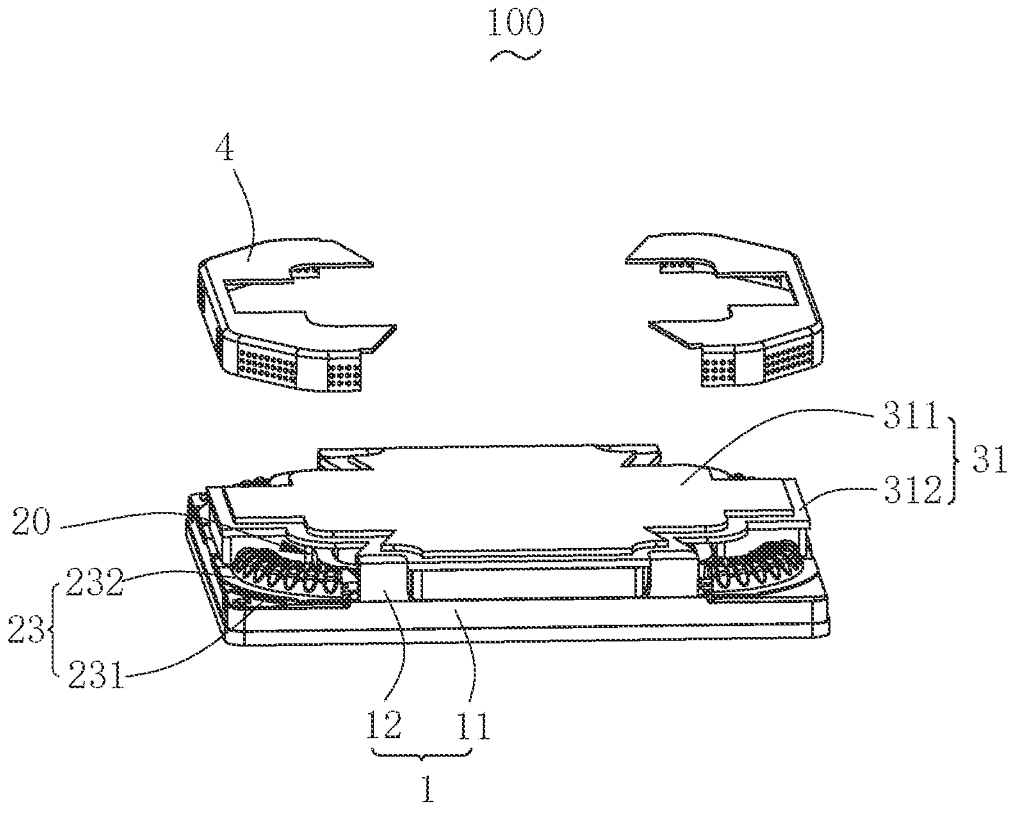
FIG. 4 is an exploded view of a speaker device according to an embodiment of the present disclosure.
Figure 5:
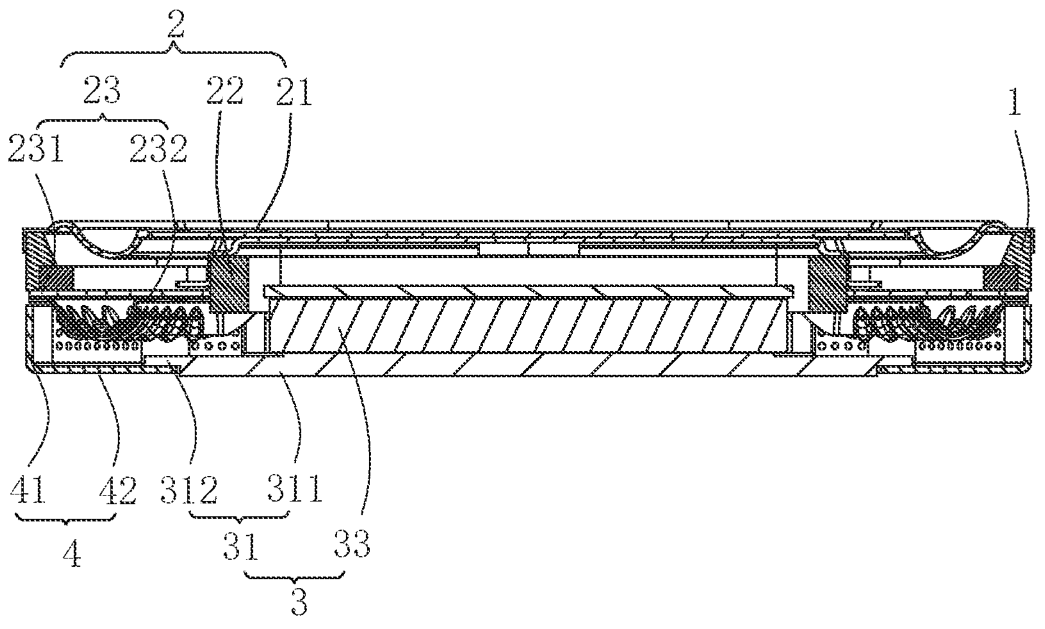
FIG. 5 is a cross-sectional view taken along a line A-A in FIG. 3 according to an embodiment of the present disclosure.

An aspect of the present disclosure provides a speaker device 100. Please refer to FIG. 1 to FIG. 6 together. The speaker device 100 includes a frame 1, a vibration unit 2, a magnetic circuit unit 3, and an air-permeable isolation member 4.

The vibration unit 2 is fixed to the frame 1. In an embodiment, the vibration unit 2 includes a diaphragm 21 fixed to the frame 1, a voice coil 22 driving the diaphragm 21 to vibrate, and an elastic support assembly 23. The elastic support assembly 23 is fixed to the frame 1 and connected to a side of the voice coil 22 away from the diaphragm 21.

The magnetic circuit unit 3 is fixed to the frame 1. The magnetic circuit unit 3 is configured to drive the vibration unit 2 to vibrate to produce sound. In an embodiment, the magnetic circuit unit 3 includes a yoke 31 fixed to the frame 1, a main magnet 32 fixed to the yoke 31, and an auxiliary magnet 33 spaced from the main magnet 32 to form the magnetic gap 30. The voice coil 22 is inserted in the magnetic gap 30 to drive the diaphragm 21 to vibrate to produce sound.

The yoke 31 is fixed to a side of the speaker device 100 away from the vibration unit 2. The yoke 31 and the frame 1 are spaced to form a leakage port 20 to enable leaking from a side surface of the speaker device 100. The frame 1, the vibration unit 2 and the magnetic circuit unit 3 jointly enclose to form a sound-producing inner cavity 10, and the sound-producing inner cavity 10 communicates with the leakage port 20.

In an embodiment, the yoke 31 includes a yoke body 311 and a yoke support groove 312. The yoke support groove 312 is formed by recessing from a periphery of a side of the yoke body 311 away from the vibration unit 2 toward the vibration unit 2. The yoke body 311 is configured to fix the main magnet 32 and the auxiliary magnet 33.

The air-permeable isolation member 4 completely covers the leakage port 20. The air-permeable isolation member 4 is configured to prevent sound-absorbing particles from entering the sound-producing inner cavity 10 through the leakage port 20. Such a structure enables the air-permeable isolation member arranged on the speaker device 100 to isolate the sound-producing inner cavity 10 from external sound-absorbing particles, that is, prevent sound-absorbing particles arranged outside the speaker device 100 from entering the sound-producing inner cavity 10, and there is no need to assemble three-dimensional mesh cloth during assembling, which is conducive to assembling and application of the speaker device 100.

In an embodiment, the air-permeable isolation member 4 includes a bottom wall 41 and a side wall 42.

The bottom wall 41 is fixed to the yoke 31. In an embodiment, the bottom wall 41 is received in and fixed to the yoke support groove 312. Such a structure is conducive to the assembly and enables the speaker device 100 to have a small thickness along a vibration direction of the diaphragm 21, which is conducive to miniaturization of the speaker device 100.

The side wall 42 bends and extends from the bottom wall 41 toward the frame 1. The side wall 42 is fixed to the frame 1.

The side wall 42 and/or the bottom wall 41 are/is provided with a leakage hole 40 penetrating the side wall 42 and/or the bottom wall 41. The leakage port 20 communicates with the outside through the leakage hole 40. The leakage hole 40 is configured to isolate external sound-absorbing particles from entering the sound producing inner cavity 10, that is, prevent sound-absorbing particles arranged outside the speaker device 100 from entering the sound producing inner cavity 10. The structure realizes self-sealing of the speaker device 100.

In an embodiment, a plurality of leakage holes 40 is arranged in a matrix on the side wall 42. Such a structure facilitates air circulation between the leakage port 20 and the outside, enables the speaker device 100 to have good acoustic performance, and further enables a side of the speaker device 100 away from the diaphragm 21 and the yoke 31 to be flat plates, which are liable to assemble and apply.

In an embodiment, the frame 1 has a rectangle shape, four leakage ports 20 are provided and respectively located at four corners of the frame 1, and two air-permeable isolation members 4 are provided and respectively located at two opposite sides of a minor axis of the frame 1. Each of the air-permeable isolation members 4 completely covers the two leakage ports 20 located at a same side of the minor axis of the frame 1. It is appreciated that, as long as the air-permeable isolation member 4 completely covers the leakage port 20, the shape of the air-permeable isolation member 4 is not limited thereto. In another embodiment, one air-permeable isolation member 4 is provided and in the shape of a ring, and the speaker device 100 can be assembled more easily and applied more widely.

In an embodiment, the elastic support assembly 23 includes an elastic member 231 and an auxiliary diaphragm

232. The elastic member 231 is fixed to the frame 1 and connected to the voice coil 22. The auxiliary diaphragm 232 is bonded to a side of the elastic member 231 away from the diaphragm 21. The elastic support assembly 23 is configured to, on the one hand, strengthen a vibration effect of the diaphragm 21 and improve the acoustic performance of the speaker device 100; on the other hand, balance the swing of the vibration unit 2 and improve the stability of the speaker device 100. Four elastic support assemblies 23 are provided and respectively arranged opposite to the four leakage ports 20, and the side wall 42 is fixed to the frame 1 through the elastic support assembly 23. The air-permeable isolation member 4 and the elastic support assembly 23 are spaced along a vibration direction of the diaphragm 21 and jointly cover the leakage port 20. The side wall 42 is bonded to the auxiliary diaphragm 232. With such a structure, the speaker device 100 has a more compact structure, which is conducive to sealing the leakage port 20 and the miniaturization of the speaker device 100.

In an embodiment, the frame 1 includes a frame body 11 and a frame leg 12 formed by extending from the frame body 11. The frame leg 12 is configured to fix the magnetic circuit unit 3. The diaphragm 21 is fixed to a side of the frame body 11 away from the frame leg 12. The yoke 31 is fixed to the frame leg 12 and is spaced from the frame body 11 to form the leakage port 20. The bottom wall 41 abuts against and is fixed to the frame leg 12. The structure is conducive to the miniaturization of the speaker device 100.

In an embodiment, the air-permeable isolation member 4 is made of a metal material or polyethylene terephthalate. In an embodiment, the air-permeable isolation member 4 is made of a steel sheet or an aluminum sheet. The leakage hole 40 is made by a laser hole burning process, a die drilling process or an etching process. In this way, the air-permeable isolation member 4 can be manufactured independently and assembled as an integral part in the speaker device 100, so that it is easy to assemble by an operator or machine, making the manufacturing of the speaker device 100 simple and improving the reliability of the speaker device 100.

Compared with the related art, in the speaker device of the present disclosure, the air-permeable isolation member includes a bottom wall fixed to the yoke and a side wall bending and extending from the bottom wall toward the frame, and the side wall is fixed to the frame, so as to form a yoke leakage structure, thereby effectively expanding an application range of the speaker device. The side wall and/or the bottom wall are provided with a leakage hole penetrating the side wall and/or the bottom wall and configured to isolate external sound-absorbing particles from entering the sound-producing inner cavity, and the leakage port communicates with the outside through the leakage hole, so as to realize self-sealing of the speaker device. With such a structure, the speaker device can isolate the sound-producing inner cavity from the outside through the air-permeable isolation member, and there is no need to assemble the three-dimensional mesh cloth only in subsequent application and assembling, which is conducive to assembling and application of the speaker device.

The above are only embodiments of the present disclosure. It should be pointed out herein that, for those skilled in the art, improvements can also be made without departing from the concept of the present disclosure, all of which fall within the protection scope of the present disclosure.

What is claimed is:

1. A speaker device, comprising a frame, a vibration unit, a magnetic circuit unit, and an air-permeable isolation member, wherein the vibration unit and the magnetic circuit unit are fixed to the frame, the magnetic circuit unit is configured to drive the vibration unit to vibrate to produce sound;

the magnetic circuit unit comprising a yoke fixed to the frame, the yoke is fixed to a side of the speaker device away from the vibration unit, the yoke and the frame are spaced to form a leakage port to enable leaking from a side surface of the speaker device;

the frame, the vibration unit, and the magnetic circuit unit jointly enclose to form a sound-producing inner cavity, the sound-producing inner cavity communicates with the leakage port;

the air-permeable isolation member completely covers the leakage port, and comprises a bottom wall and a side wall, the bottom wall is fixed to the yoke, the side wall bends and extends from the bottom wall toward the frame, and the side wall is fixed to the frame; and the side wall and/or the bottom wall are provided with a leakage hole penetrating the side wall and/or the bottom wall, and are configured to isolate external sound-absorbing particles from entering the sound-producing inner cavity, and the leakage port communicates with the outside through the leakage hole.

2. The speaker device as described in claim 1, wherein the frame has a rectangle shape, four leakage ports are respectively located at four corners of the frame, two air-permeable isolation members are respectively located at two opposite sides of a minor axis of the frame, and each of the air-permeable isolation members completely covers the two leakage ports located at a same side of the minor axis of the frame.

3. The speaker device as described in claim 1, wherein one air-permeable isolation member is provided and has a ring shape.

4. The speaker device as described in claim 1, wherein the yoke comprises a yoke body and a yoke support groove, the yoke support groove is formed by recessing from a side of a periphery of the yoke body away from the vibration unit toward the vibration unit, and the bottom wall is received in and fixed to the yoke support groove.

5. The speaker device as described in claim 2, wherein the vibration unit comprises a diaphragm fixed to the frame, a voice coil driving the diaphragm to vibrate, and an elastic support assembly fixed to the frame and connected to a side of the voice coil away from the diaphragm; and four elastic support assemblies are arranged right opposite to the four leakage ports, respectively, the side wall is fixed to the frame through the elastic support assembly, and the elastic support assembly and the yoke are spaced along a vibration direction of the diaphragm and jointly cover the leakage port.

6. The speaker device as described in claim 5, wherein the elastic support assembly comprises an elastic member and an auxiliary diaphragm, the elastic member is fixed to the frame and connected to the voice coil, the auxiliary diaphragm is bonded to a side of the elastic member away from the diaphragm, and the side wall is bonded to the auxiliary diaphragm.

7. The speaker device as described in claim 5, wherein the frame comprises a frame body and a frame leg formed by extending from the frame body, the diaphragm is fixed to a side of the frame body away from the frame leg, the yoke is fixed to the frame leg and is spaced from the frame body to form the leakage port, and the bottom wall abuts against and is fixed to the frame leg.

8. The speaker device as described in claim 1, wherein the air-permeable isolation member is made of a metal material or polyethylene terephthalate.

9. The speaker device as described in claim 8, wherein the air-permeable isolation member is made of a steel sheet or an aluminum sheet.

10. The speaker device as described in claim 8, wherein a plurality of leakage holes is arranged in a matrix on the side wall.

* * * * *